US009709393B2

(12) United States Patent
Oppenheim

(10) Patent No.: US 9,709,393 B2
(45) Date of Patent: Jul. 18, 2017

(54) DEVICE FOR MAKING COLLINEAR EQUIDISTANT MARKS

(71) Applicant: Michael Oppenheim, Easton, CT (US)

(72) Inventor: Michael Oppenheim, Easton, CT (US)

( * ) Notice: Subject to any disclaimer, the term of this patent is extended or adjusted under 35 U.S.C. 154(b) by 111 days.

(21) Appl. No.: 14/752,889

(22) Filed: Jun. 27, 2015

(65) Prior Publication Data

US 2016/0018222 A1 Jan. 21, 2016

Related U.S. Application Data

(60) Provisional application No. 62/025,086, filed on Jul. 16, 2014.

(51) Int. Cl.
*G01C 9/34* (2006.01)
*G01C 15/02* (2006.01)

(52) U.S. Cl.
CPC ............... *G01C 9/34* (2013.01); *G01C 15/02* (2013.01)

(58) Field of Classification Search
CPC ...................................................... G01C 15/02
USPC .................................................... 33/675, 379
See application file for complete search history.

(56) References Cited

U.S. PATENT DOCUMENTS 229,777 A * 7/1880 Villa ........................ B25D 5/02 33/675
1,398,871 A * 11/1921 Livingston ................ B43L 9/12 33/675
3,371,423 A 3/1968 Paul
4,241,510 A 12/1980 Radecki
4,981,400 A * 1/1991 Stover .................. B23B 47/287 33/667
5,647,139 A * 7/1997 Richardson .......... G01B 5/0025 33/533
6,785,977 B1 9/2004 Chrichton
6,907,671 B2 * 6/2005 Conner .................... G01B 3/08 33/416
7,210,243 B2 5/2007 Schmidt et al.
7,503,126 B2 3/2009 Robins
7,513,056 B1 4/2009 Hobden et al.
7,690,129 B2 4/2010 Bender
7,814,675 B2 10/2010 Venderley et al.
8,225,520 B2 7/2012 Rabin
8,261,462 B2 9/2012 Coyle
8,286,363 B1 * 10/2012 Martinez ................ A47G 1/205 33/451
2003/0033722 A1 2/2003 Lanham (Continued)

*Primary Examiner* — Yaritza Guadalupe-McCall
(74) *Attorney, Agent, or Firm* — Ware, Fressola, Maguire & Barber LLP

(57) ABSTRACT

The present invention is directed to a marking device that includes a main backplate. At the center of the marking device there may be a central hole, and attached to the backplate, are two extendable arms, each designed with a pin attachment to make marks and/or small holes in the wall material. The extendable arms are attached to the backplate in a manner that the arm pin attachments on each arm are perfectly aligned with the central hole. Using a set of gears or other method, the extendable arms are fitted to the back plate in a manner whereby the extension and/or retraction of one arm causes the other arm to move in an equal, but opposite manner. With this, the holes and/or marks will be equidistant from the central hole/pin hole, and also in-line with the center hole/pin hole and each other.

14 Claims, 2 Drawing Sheets

(56) References Cited

U.S. PATENT DOCUMENTS

| | | | | |
|---|---|---|---|---|
| 2009/0188121 | A1 | 7/2009 | Rabin | |
| 2016/0018222 | A1* | 1/2016 | Oppenheim | G01C 15/02<br>33/669 |

* cited by examiner

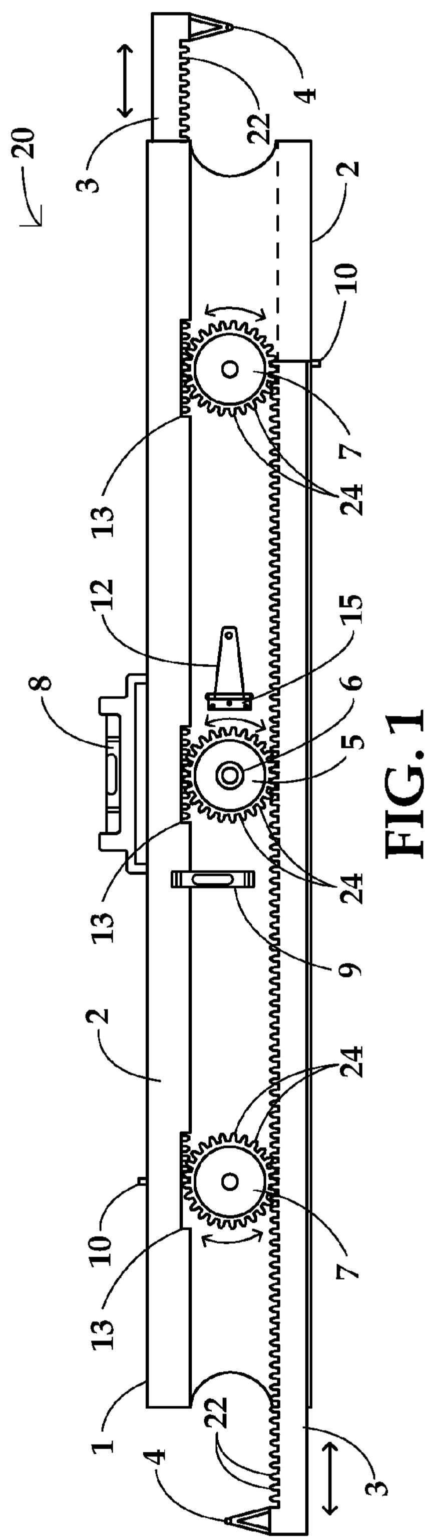
FIG. 1
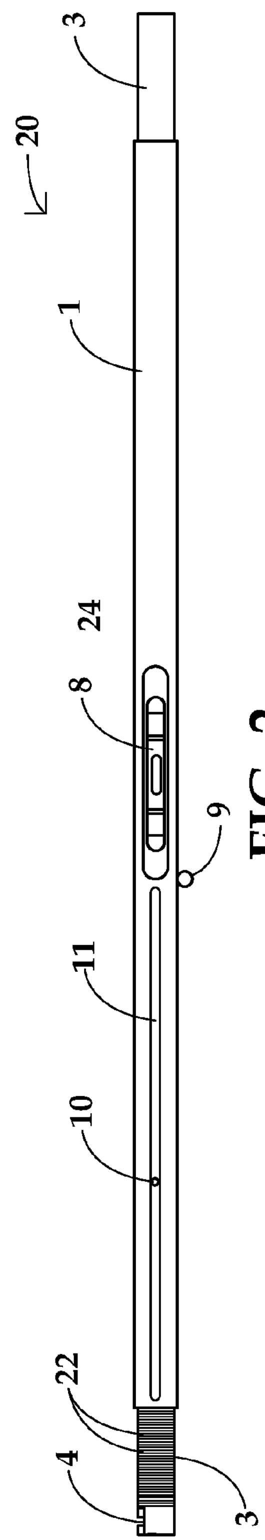
FIG. 2
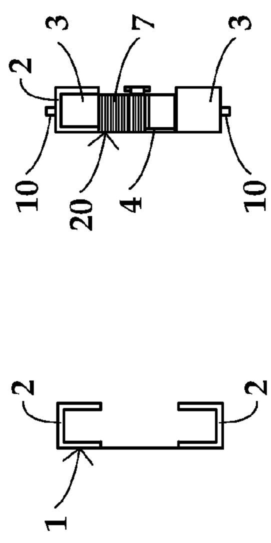
FIG. 3
FIG. 4
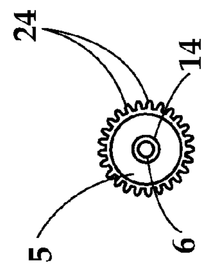
FIG. 5

DEVICE FOR MAKING COLLINEAR EQUIDISTANT MARKS

CROSS-REFERENCE TO RELATED APPLICATIONS

This application claims priority to U.S. Provisional Appl. No. 62/025,086 filed Jul. 16, 2014, which is hereby incorporated by reference in its entirety.

BACKGROUND OF THE INVENTION

1. Field of the Invention

The present invention is generally related to a device for making collinear equidistant marks, and more particularly to a device for making equally spaced marks for use in hanging multiple objects from wall surfaces.

2. Description of Related Art Prior devices used to make marks for hanging wall objects primarily involve the creation of two level marks or holes. Some devices are designed to obtain the precise location of two attachment points from a single frame or object to be hung, and once measured on to the device, the device is placed on the wall to transfer the marks, typically incorporating a level, so that the transferred marks are level. None of these devices were designed to, or optimally can be used to, create three or more evenly-spaced, level marks that can be used for the purposes of hanging multiple items on a wall.

For example, U.S. Pat. No. 8,261,462 is directed to a fixed-length device with movable parts. The device uses rods to hang more than one picture frame so that the tops of the frames are aligned with the main portion of the device. The rods mark the hanging positions on the wall. The device appears to be suitable for hanging similar picture frames with different attachment points and methods of hanging, e.g. one frame uses a wire and another frame has a fixed bracket. However, the device discussed in U.S. Pat. No. 8,261,462 is a fixed size, and cannot be configured to evenly space the marks.

U.S. Pat. No. 6,785,977 is directed to a device that is essentially a square ruler with two sliding attachments and a level. The device is meant to transfer two hanging points from one picture frame to the device, and then to the wall. This device provides no ability to self-center two points from a middle point.

U.S. Pat. No. 7,690,129 is directed to a device that is essentially a large ruler with a zero coordinate in the middle, and even measurements to the right and left in inches. The device includes spirit levels on the X and Y axis. However, the device has no ability to create marks on a surface, and has no ability to self-center two points from a middle point, instead the marks must be done manually above or below the device with a separate implement.

U.S. Pat. No. 7,814,675 is directed to a device that is similar to a slide-rule, and has two movable points designed to hold picture hooks in place. Once measured out, the user must then drive fasteners through the hangers. The sliding arms must each be moved manually and spaced per measurement marks. This device has no ability to create marks on a surface, and no ability to self-center two points from a middle point.

U.S. Pat. No. 7,210,243 is directed to a device similar to a small carpenter's level with sliding arms attached to the top of the level. Each arm has a fastener locator that also moves within the confines of a portion of each arm. The arms are not interdependent, and rely on the user to extend the arms evenly if desired. This device has no ability to create marks on a surface, and no ability to self-center two points from a middle point.

U.S. Pat. No. 3,371,423 is directed to a device that resembles a complicated slide-rule with attached flat section with multiple holes. It appears to be designed to accurately place marking for holes for drape or window curtain installation. The device is set on one side of the top corner of a window frame, adjusted, and then a hole(s) is marked. This device has no ability to create marks on a surface, and no ability to self-center two points from a middle point.

U.S. Pat. No. 4,241,510 is directed to a device that is a large T-shaped (as used, the "T" is upside down) ruler with spirit levels. Sliding units on each side are used to measure the location of picture hanging hooks. The vertical arm provides measurements, as do the horizontal arms. This device has no movable arms, no ability to create marks on a surface, and no ability to self-center two points from a middle point.

U.S. Appl. Publ. No. 2009/0188121 is directed to a device that resembles a ruler with sliding attachments that ride along the ruler, and once placed by the user, pressure is applied to make marks in the wall. This device as designed cannot make more than two marks, has no movable arms, and has no ability to self-center two points from a middle point.

U.S. Pat. No. 7,503,126 is directed to a device that resembles a box with three or four retractable tape-measure arms. It appears to be designed to be placed on the back of a picture frame so that the user may transfer measurements from the frame, e.g. the placement of the hanging wire, to the device, and then to the wall. It also has no ability to create marks on a surface, and no ability to self-center two points from a middle point.

U.S. Appl. Publ. No. 2003/0033722 is directed to a device with a level and telescoping arms. The arms are marked with measurement marks, and the user could therefore space two marks from each other in a level manner. There is no ability in this device to self-center the two arms from a middle point. The user must ensure that both sides are deployed exactly evenly, and remain so while in use. The device lacks a vertical axis spirit level for spacing vertical marks.

U.S. Pat. No. 7,513,056 is directed to a device that is a carpenter's level with 4 spirit levels and adjustable markers that can be moved within a section of each the right and left side. The markers are captured within the device, and measurement markings allow the user to position each marker the desired distance from the center. There is no provision for affixing the device to the center mark, and the markers move independently, with no ability to self-center two points from a middle point. U.S. Pat. No. 8,225,520 is directed to a device that is a modification of a typical retractable tape measure. Attached to the tape are sliding implements capable of making marks. This device appears to be designed to transfer two mounting points from a single frame to the device and then to a wall. There is no provision for affixing the device to the center mark, and the markers move independently, with no ability to self-center two points from a middle point.

As seen from the references discussed above, the problems related to hanging pictures or other ornamental objects on a wall or other surface in a manner that three or more of the items are intended to be collinear with each other and evenly spaced has not been adequately addressed. It is a common endeavor of many persons to hang and/or display pictures or other objects in such a manner. While there are a number of ways to hang, for example, three or more picture frames on a wall so that each is level with each other, and all have the exact same spacing, none of the techniques are simple, nor do they promise satisfactory results for the user. Many separate tools and/or other items may be required to perform such a task, including, but not limited to, a spirit level, tape measure, pencil, laser level, yardstick, or other measuring devices. The techniques required are cumbersome, inaccurate, cause damage to walls, and are often not possible without the assistance of a second person. Therefore, what is needed is a device, mechanism and/or method to solve the problems that are attendant upon prior art devices and method and is capable of efficiently allowing the hanging of objects on wall surfaces so that the objects are positioned collinear and equidistant relative to each other.

SUMMARY OF THE INVENTION

In order to overcome the above noted limitations, the present invention is directed to a marking device that includes a main backplate. At the center of the marking device there may be a central hole that can also have a flip-over pin attachment used to press into and/or mark wall material of a wall surface. Attached to the backplate, are two extendable arms, each designed with a pin attachment to make marks and/or small holes in the wall material. The extendable arms are attached to the backplate in a manner that the arm pin attachments on each arm are perfectly aligned with the central hole. Using a set of gears or other method, the extendable arms are fitted to the back plate in a manner whereby the extension and/or retraction of one arm causes the other arm to move in an equal, but opposite manner. With this, the holes and/or marks created by the user by employing the pin attachments on both extendable arms will be equidistant from the central hole/pin hole, and also in-line with the center hole/pin hole and each other. Near the central hole there may be affixed two spirit levels, one aligned with the backplate's x-axis (horizontal), and one aligned with the backplate's y-axis (vertical).

In accordance with one exemplary embodiment of the present invention a plastic backplate, preferably having a length of between approximately 12" and 24", may be provided. Riding in a channel at the top of the backplate may be an arm that extends to the left, and riding in a channel at the bottom of the backplate may be an arm that extends to the right. A series of gears, three, for example, may be affixed to the backplate along the horizontal centerline of the backplate, in a manner that the gears would keep the arms in contact with the upper and lower channels in an a manner that allowed the arms to slide, but in a manner that kept the arms from having too great of tolerances with respect to the track, so that the arms remain parallel to each other at all times and parallel to the backplate. The central gear will be affixed to the backplate so that the gear rides a protrusion from the backplate that also serves as the central hole. The other two gears (left side and right side) will be affixed to the backplate in line with the central gear. From any arm position (collapsed, fully extended, or anywhere in between), the action of moving one arm (extension or collapsing) will cause two, or all the gears, to rotate. This will cause the other arm to move in an equal and opposite manner. Each arm may include a small protrusion on the non-pin arm end of the arm, on the opposite side of the gear teeth. This protrusion will fit a slot in the backplate in a manner that the arms cannot over travel in either the collapsed or extended positions. While fully collapsed, and for some range of motion while extending, both arms will be in contact with all three gears. At a point determined by the exact location of the side gears, each arm will lose contact with the gear on the opposite side of the device. However, at all times during the range of motion, both arms will be in contact with the central gear. It is this action that will ensure that the arms move interdependently. Each arm will maintain contact with the secondary gear on that arm's side. Contact with at least two gears will ensure smooth but stable action of the arms.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which:

FIG. 1 is a front view of an exemplary embodiment of the marking device in accordance with the present invention;

FIG. 2 is a top plan view of the exemplary embodiment of the marking device in accordance with the present invention;

FIG. 3 is a side view of an exemplary back plate that may be used with the exemplary embodiment of the marking device, other components of the marking device have been removed for clarity;

FIG. 4 is a side view of the exemplary embodiment of the marking device in accordance with the present invention;

FIG. 5 is a view of an exemplary central gear that may be used with the exemplary embodiment of the marking device in accordance with the present invention;

DETAILED DESCRIPTION OF THE INVENTION

Figure 6:
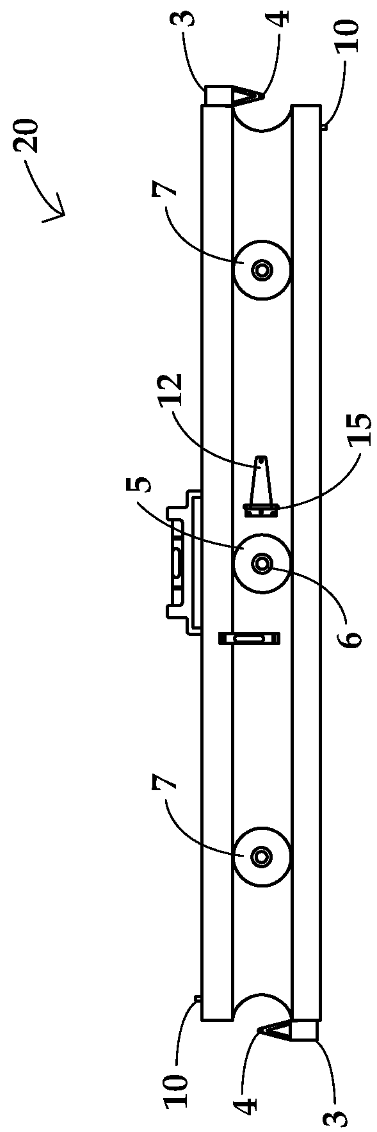
FIG. 6 is front view of the exemplary embodiment of the marking device with its exemplary arms in a retracted position.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 7:
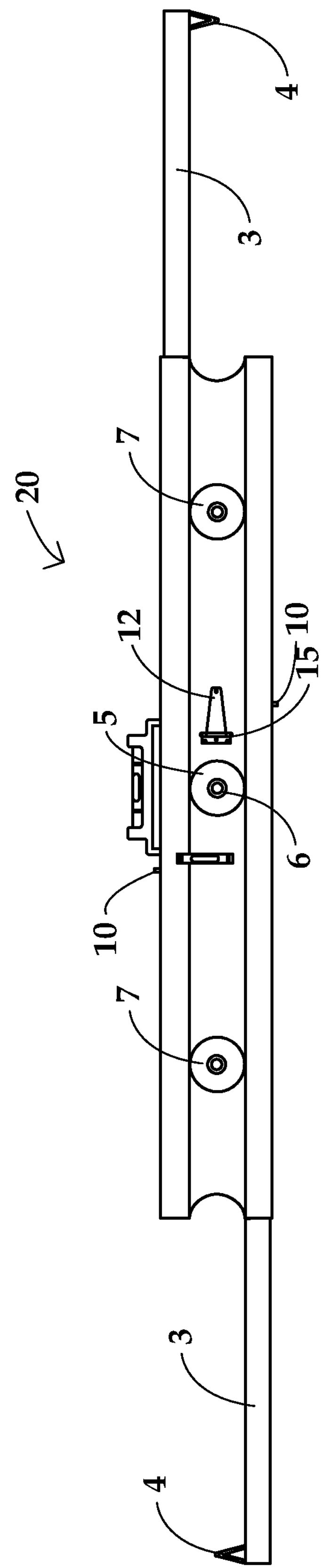
FIG. 7 is a front view of the exemplary embodiment of the marking device with its exemplary arms in an extended position.

Referring to FIGS. 1-2 and 6-7, therein illustrated is an exemplary marking device, generally indicated by reference numeral 20, in accordance with the present invention. The marking device is constructed and configured so as to facilitate the marking and/or hanging of objects on surfaces, such as walls, by providing a means for making three or more collinear equal distant marks that can then be used to install appropriate fasteners for hanging the objects. While it is understood that the collinear marks may be positioned level with respect to a vertical or horizontal axis, it is further understood that the present invention is not limited to such positioning of the marks that the marking device is capable of making. The marking device 20 includes a backplate 1 that has a substantially smooth back surface, a central portion and a pair of channels 2 positioned on opposite sides of the central portion each for housing an extendable arm 3. The extendable arms 3 are configured for movement within and/or along the channels 2 located on the upper and lower edges of the backplate 1. Each of the extendable arms 3 includes a pin 4 positioned at one end of the extendable arm 3, and the pin 4 is configured to either mark a surface or provide an alignment mechanism for using an implement, such as a pencil or marker, to make a mark on the wall surface. Each pin 4 is affixed to the respective extendable arm 3 in a manner that the pin 4 does not contact the wall surface when the backplate 1 is applied to the wall surface, and thereby the pin 4 may be positioned approximately the thickness of the backplate 1 away from the wall surface when the backplate 1 is positioned on the wall surface. The pins 4 may be attached to the extendable arms 3 in a manner that the pins 4 have movement enough so that the pin 4 would be able to be pressed into or otherwise mark contact with a wall in order to make a mark, depression and/or hole. The pins 4 may be located on each extendable arm 3, so that the pins 4 are collinear with a central hole 6 in the center of the backplate 1, and preferably the pins 4 and the hole 6 are positioned level along the horizontal axis of the backplate 1. Therefore, any mark created by the pins 4 will be collinear with each other and the central hole 6, and thereby creating a straight, and preferably level, line between the pins 4 on opposite ends of the marking device 20. Each of the extendable arms 3 further includes a plurality of teeth 22 (not shown in FIGS. 6-7 for simplicity), that are configured to operatively engage at least with corresponding teeth 24 positioned about the periphery of a central gear 5 affixed to the backplate 1 of the marking device 20. The central gear 5 may be mounted on the backplate 1 through use of a protrusion 14 as shown for example in FIG. 5. Preferably, the extendable arms 3 could be constructed of a rectangular rod with gear teeth, commonly referred to as a "rack" that would mesh with one or more spur gears, such as the central gear 5, in a manner that the movement of the gears causes smooth motion of the extendable arms 3. The backplate 1 may include openings 13 within the channels of the backplate 1 in order to allow engagement of the central gear 5 with the extendable arms 3.

Still referring to FIGS. 1-2 and 6-7, the central gear 5 is operatively connected to the backplate 1 so as to allow for rotational movement of the central gear 5 relative to the backplate 1, and the central gear 5 may further include includes a central hole 6 formed therein that is positioned on or about the midpoint of the backplate 1. The teeth 22 of the extendable arms 3 are operatively engaged with the teeth 24 of the central gear 5 such that when one of the extendable arms 3 is moved away or towards the backplate 1, the central gear 5 is rotated, and the rotation of the central gear 5 is transferred to linear movement of the other extendable arm 3 so that the opposite extendable arm 3 moves away from or towards the backplate 1 the same distance as the other extendable arm 3 has been moved, as will be discussed further below. The marking device 20 may also include one or more secondary gears 7 that are positioned within the central portion of the backplate 1, and operatively connected to the backplate 1 so as to allow for rotational movement of the secondary gears 7 relative to the backplate 1. Each of the secondary gears 7 may also include a plurality of teeth 24 (not shown in FIGS. 6-7) that are configured for operative engagement with the teeth 22 of the extendable arms 3. The secondary gears 7 are configured to operate in the same manner as the central gear 5, such that movement of one of the extendable arms 3 causes rotation of the secondary gears 7, which is then transferred to linear movement of the other extendable arm 3. In order to guide the movement of the extendable arms 3, the marking device 20 may also include an overtravel stop 10 extending from an end of each extendable arm 3 opposite the end on which the pin 4 is attached, and a travel slot 11 formed in the upper and lower surface of the backplate 1 of the marking device 20. The overtravel stop 10 is configured to move linearly within the travel slot 11 during movement of the extendable arm 3, but the travel slot 11 is dimensioned to ensure that the extendable arms 3 are not moved into such positions so as to disengage from the central gear 5 and/or secondary gears 7. Furthermore, each extendable arm 3 may be delineated with marks for measurement units (not shown) so that the distant of the pin 4 of each extendable arm 3 from the center hole 6 can be readily identified. These marks for measurement units (not shown) can be visible as the extendable arms 3 emerge from the channels of the backplate 1. Alternatively, marks for measurement units could be implemented on the backplate 1 near the travel slot 11 so that the overtravel stops 10 would indicate the distance of the pin 4 of each extendable arm 3 from the central hole 6.

Still referring to FIGS. 1-2 and 6-7, the marking device 20 may also include a flipover central pin marker 12 that may be attached to the backplate 1 by a hinge 15. The flipover central pin marker 12 is configured so that when actuated about the hinge 15 the flipover central pin marker 12 may be aligned with the central hole 6 within the central gear 5. Thereby providing a mechanism for producing an additional mark on the wall surface in line with the marks that may be produced by the pins 4 on each of the extendable arms 3. The marking device 20 may also include a horizontal spirit level 8 and/or a vertical spirit level 9 that are configured to allow a user to determine whether the marking device 20 is positioned level, true and/or plumb on the wall surface.

The operation and use of the marking device 20 according to the present invention will now be discussed. With the marking device 20, a user selects a location of the desired center point of the objects to be hung and/or affixed on a surface, for example a wall surface. The user then uses the flipover central pin 12, or drives a nail or other fastening device through the central hole 6, but preferably not so far as to drive the head of the nail all the way to the marking device 20. This action will now support the majority of the weight of the marking device 20. Next, the user may ensure that the marking device 20 is level via the horizontal spirit level 8, if such levelness is desired. One extendable arm 3 may then be deployed the desired distance, which desired distance may be indicated by marking for measurement units (not shown) on the marking device 20. The measuring units may be metric or standard units. Through the operation of the central gear 5 and/or the secondary gear 7 the extendable arm 3 that is not actuated by the user is also extended the same desired distance as the actuated extendable 3. This occurs because the marking device 20 according to the present invention is configured so that movement of one extendable arm 3 causes equal movement of the other extendable arm 3 in the opposite direction. Once at the desired location of the extendable arm 3, the user will activate the pin 4 by to create a second mark, the hole or mark created by the nail being the first mark, by either pressing the pin 4 against the wall surface or using a marking implement to mark the location of the pin 4. The user will then activate the pin 4 on the other extendable arm 4, thusly marking a third mark. The user will then remove the marking device 20 (by removing the partially nailed in nail, if used), and will have three marks that are collinear and evenly spaced, and may be level if the horizontal spirit level 8 was optionally used during the marking process. Should the user desire to create four or more marks in this manner, for example, one more hole to the right side, the user would re-deploy the marking device 20 so that the marking device's 20 central hole 6 was re-located to the right or left side mark on the wall surface depending upon the direction in which the additional holes may be desired. Then the user would deploy the appropriate extendable arm 3 to the original center mark (first mark), and by activating the pin 4 on the other extendable arm 3, a fourth mark would be created such that it had the same spacing as between the other three marks, and was also collinear with the first three marks. This task could be repeated as many times as the user had space for. By using the device on the vertical axis, the above could be repeated, but the effect would create three or more marks that were collinear and also evenly spaced in a vertical direction.

In alternative embodiments of the present invention, the extendable arms 3 could be made of a semi-round rod with tooth-shaped side with the gears 5, 7 meshing to the semi-round rod arm, as opposed to a rectangular arm. The central gear 5 could be replaced with a number of other apparatus that could cause equal and opposite movement in the two extendable arms 3, for example a retractable spool under tension with a cord attached to the extendable arms 3 could be used. Each extendable arm 3 could be made so that the extendable arm 3 itself also extends a fixed length via telescopic extension. This would allow the marking device 20 to create marks even further apart from the central hole 6. The channels could be designed in a manner that the extendable arms 3 were secured in a way that the device required only one central gear 5 to cause the extendable arms 3 to act interdependently yet remain parallel and true. This could be, for example, where the back sides of the extendable arms 3 are grooved in a manner that that they attach to the backplate 1 by a rail that is affixed to, or incorporated into the shape of, the backplate 1. The ends of the extendable arms 3 could have a number of different marking devices. While pins 4 that create small holes may be preferred, the ends could be fitted with round holes for marking with a pencil or marker, or could use a section of pencil or pencil lead (graphite) to mark the location. The backplate 1 or whole marking device 20 could be made out of metal such as aluminum or steel, or a combination of metal and plastic parts. For example, the marking device 20 or any component thereof can be made out of a lightweight, but strong member of the plastic or polymer family. This will allow the marking device to be easy to handle and use, as well as non-marking to the wall.

Furthermore, the central hole 6 could be designed to be at an angle other than 90° from wall, since most picture-hanging nails are driven in to walls between 20° and 45°. The flip over central pin marker could be omitted from the design altogether if more severe angle for the central hole is required for the device.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A marking device, comprising:

a backplate having a first channel and a second channel disposed on the backplate so as to face the first channel;

a central gear operatively connected to the backplate and configured for rotation relative to the backplate; and a first extendable arm disposed at least partially within the first channel and a second extendable arm disposed within the second channel; and a hole positioned at a central axis of the central gear, and a coextensive hole positioned in the backplate at the central axis of the central gear so that an opening is formed through the central gear and the backplate; and wherein the first extendable arm and the second extendable arm are operatively connected to the central gear so that movement of either the first extendable arm or the second extendable arm is imparted to the other extendable arm.

2. The marking device according to claim 1, wherein the first extendable arm is configured for rectilinear movement along the first channel, and the second extendable arm is configured for rectilinear movement along the second channel.

3. The marking device according to claim 2, wherein the rectilinear movement of either the first extendable arm or the second extendable arm causes rotational movement of the central gear.

4. The marking device according to claim 3, wherein the rotational movement of the central gear causes rectilinear movement of the first extendable arm or the second extendable arm.

5. The marking device according to claim 1, wherein the first extendable arm, the second extendable arm and the central gear are operatively connected so that movement of the first extendable arm causes equal and opposite movement of the second extendable arm.

6. The marking device according to claim 1, wherein linear movement of the first extendable arm along the first channel causes rotational movement of the central gear about a central axis of the central gear, and the rotational movement of the central gear is converted into linear movement of the second extendable arm along the second channel.

7. The marking device according to claim 1, wherein each of the first extendable arm and the second extendable arm comprises a pin positioned collinear with the opening formed through the central gear and the backplate.

8. The marking device according to claim 7, wherein the pins on the first extendable arm and the second extendable arm and the opening are positioned collinearly level along a horizontal axis.

9. The marking device according to claim 8, wherein the pin on each of the first extendable arm and the second extendable arm is configured to be positioned equal distant from the opening formed through the central gear and the backplate at all times.

10. The marking device according to claim 7, further comprising an attachment mechanism configured to be inserted through the opening formed through the central gear and the backplate and configured to removably affix the marking device to a surface.

11. The marking device according to claim 1, further comprising at least one secondary gear operatively connected to the first extendable arm and the second extendable arm so that movement of either the first extendable arm or the second extendable arm is imparted to the other extendable arm.

12. The marking device according to claim 1, further comprising a horizontal spirit level and a vertical spirit level.

13. The marking device according to claim 1, wherein each of the first extendable arm and the second extendable arm further comprise a plurality of teeth extending therefrom, and positioned for operative engagement with teeth of the central gear.

14. The marking device according to claim 1, wherein the central gear is positioned substantially in the center of the backplate.

* * * * *